United States Patent
Hanaoka et al.

(10) Patent No.: US 6,611,442 B2
(45) Date of Patent: Aug. 26, 2003

(54) CONTROLLED RECTIFIER EQUIPMENT WITH SINUSOIDAL WAVEFORM SUPPLY CURRENT

(75) Inventors: Hiroyuki Hanaoka, Toshima-ku (JP); Hiroshi Sakaba, Toshima-ku (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 10/113,713

(22) Filed: Apr. 1, 2002

(65) Prior Publication Data

US 2002/0145897 A1 Oct. 10, 2002

(30) Foreign Application Priority Data

Mar. 30, 2001 (JP) .......................................... 2001-100169

(51) Int. Cl.$^7$ ............................................... H02M 5/42
(52) U.S. Cl. ............................ 363/84; 363/125; 363/89
(58) Field of Search ............................. 363/53, 44, 86, 363/84, 89, 125, 126, 127

(56) References Cited

U.S. PATENT DOCUMENTS 5,638,265 A * 6/1997 Gabor ........................... 363/89
5,771,164 A 6/1998 Murai et al.
5,880,947 A * 3/1999 Imanaka et al. ............... 363/89

FOREIGN PATENT DOCUMENTS

| JP | 06-090569 | 3/1994 |
| JP | 07-131984 | 5/1995 |
| JP | 08-223920 | 8/1996 |
| JP | 09-023656 | 1/1997 |
| JP | 10-337032 | 12/1998 |

* cited by examiner

Primary Examiner—Shawn Riley
(74) Attorney, Agent, or Firm—Rankin, Hill, Porter & Clark LLP

(57) ABSTRACT

A controlled rectifier equipment with sinusoidal waveform supply current is provided, in which equipment an inexpensive AC current transformer can be used as an AC current detector. The AC current transformer is used as an AC current detector. A DC component eliminating circuit including a low pass filter which cuts off the frequency component of commercial AC power supply is arranged on the line between an current controller in a current control system and a modulation circuit in the conduction control signal generating circuit. The circuit is formed so that a DC offset component which is generated in a controlled rectifier equipment may be eliminated.

12 Claims, 8 Drawing Sheets

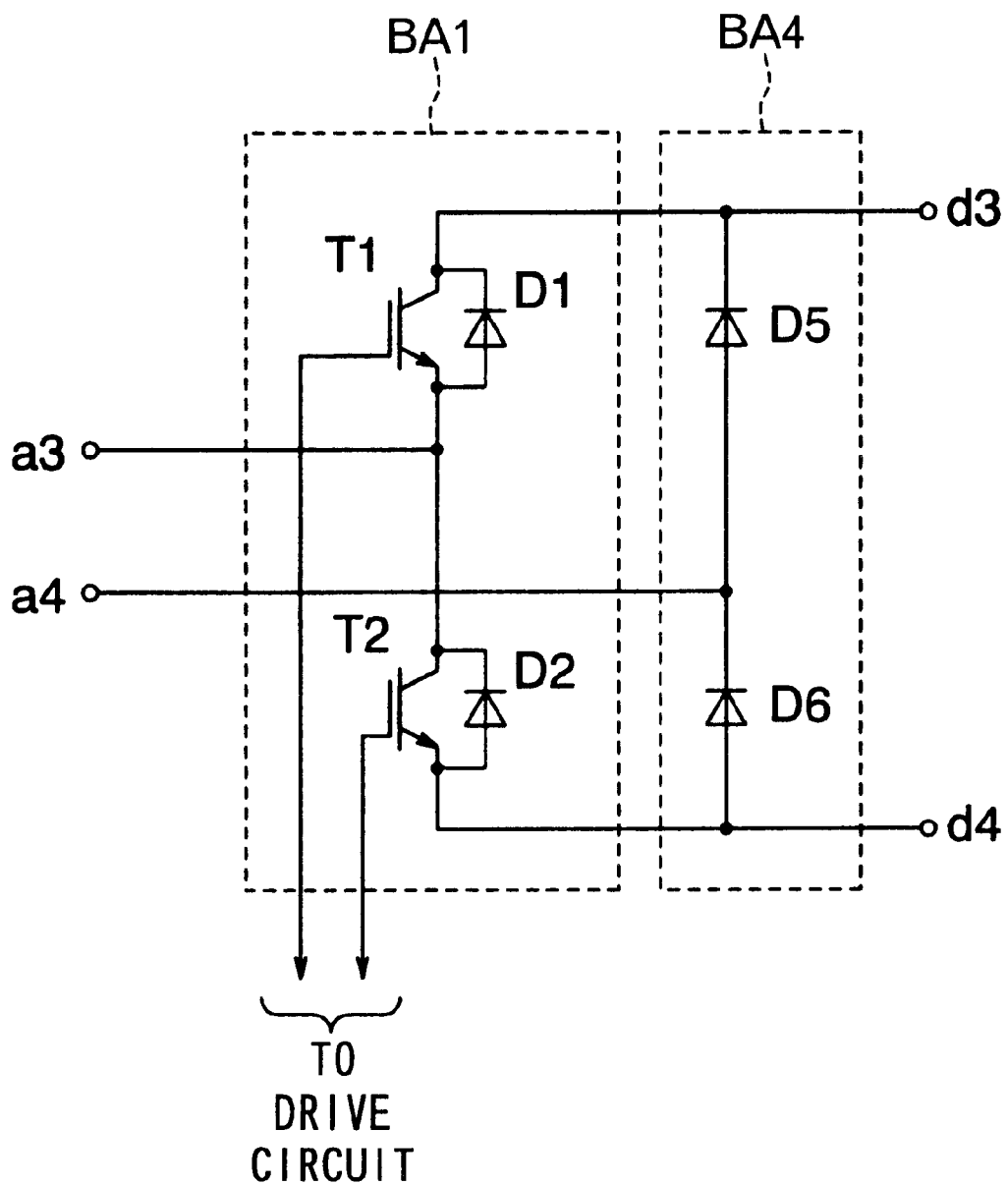

CONTROLLED RECTIFIER EQUIPMENT WITH SINUSOIDAL WAVEFORM SUPPLY CURRENT

BACKGROUND OF THE INVENTION

This invention relates to a controlled rectifier equipment with sinusoidal waveform supply current which converts AC voltage to DC voltage in such a manner that the waveform of the AC supply current may be a sinusoidal waveform.

In the conventional controlled rectifier equipment with sinusoidal waveform supply current, a DC current offset component is superposed on a supply current. The DC component causes an unnecessary electric power consumption and badly affects various electric power devices connected to the power supply. Therefore an electric current detector using a hall device ("DCCT" hereinafter) which can detect a DC current has been used to detect and eliminate the DC component.

The conventional controlled rectifier equipment with sinusoidal waveform supply current comprises a controlled rectifier circuit and a conduction control signal generating circuit. The conduction control signal generating circuit generates conduction control signals to semiconductor switching devices included in the controlled rectifier circuit so that a predetermined DC output voltage can be obtained and so that the waveform of the supply current may be sinusoidal waveform. A DCCT (an electric current detector for detecting direct current) and a reactor are connected in series between an AC current supply and a controlled rectifier circuit. The conduction control signal generating circuit obtains the difference between a DC current (including a DC offset component) detected by the DCCT and a current controlling signal which is needed or used to conform the output voltage of the controlled rectifier circuit to a predetermined DC voltage. Then a modulation circuit modulates the difference signal. The modulated difference signal is supplied to a drive circuit which output driving signals (conduction control signals) for driving the controlled rectifier circuit. The offset component detected by the DCCT is cancelled by the above difference operation, and as a result it is possible to input AC current having a sinusoidal waveform without the DC component.

However, a DCCT is expensive and a DC power supply is necessary for the DCCT as well as many accompanying circuits. Therefore it is increasingly difficult with conventional equipment to meet the recent cost decreasing demands.

It is an object of the present invention to provide a controlled rectifier equipment with sinusoidal waveform supply current which can be produced at a low cost without using an expensive electric current detector having hall devices.

It is another object of the present invention to provide a controlled rectifier equipment with sinusoidal waveform supply current which can eliminate a DC component using an AC current transformer.

It is still another object of the present invention to provide a controlled rectifier equipment with sinusoidal waveform supply current which can be manufactured in a simple configuration.

SUMMARY OF THE INVENTION

The present invention aims to improve a controlled rectifier equipment comprising a controlled rectifier circuit having a plurality of semiconductor switching devices which can be controlled, and a conduction control signal generating circuit. The conduction control signal generating circuit gives conduction control signals to the plural semiconductor switching devices for controlling the conducting angle of the plural semiconductor switching devices so that the controlled rectifier circuit may convert an AC power into an DC power and yet so that the waveform of the AC supply current maybe a sinusoidal waveform. The conduction control signal generating circuit includes an AC current detecting circuit, an AC voltage detecting circuit, a DC voltage detecting circuit, a current control signal generating circuit, a modulation circuit and a driving circuit. The AC current detecting circuit has an AC current detector for detecting the AC supply current and outputs an AC current detecting signal by processing an output signal form the AC current detector. The AC current transformer is used as the AC current detector. The AC voltage detecting circuit detecting an AC voltage supplied to the controlled rectifier circuit and generating an AC voltage detecting signal by processing the AC voltage. The DC voltage detecting circuit detecting a DC voltage outputted from the controlled rectifier circuit and generating a DC voltage detecting signal by processing the DC voltage. A current control signal generating circuit generates a current control signal based on the AC current detecting signal, the AC voltage detecting signal, the DC voltage detecting signal and a voltage command signal commanding a DC voltage value to be outputted from the controlled rectifier circuit. The current control signal is so formed as to make the waveform of the AC supply current a sinusoidal waveform and make the DC voltage from the controlled rectifier circuit such the DC voltage value as commanded by said DC voltage command signal. The modulation circuit for modulating the current control signal and generating a modulated current control signal. The driving circuit generates the conduction control signals based on the modulated current control signal. The current control signal generating circuit has a DC component eliminating circuit for eliminating a DC component which causes an offset of the AC supply current from the current control signal or the modulated current control signal.

A current control signal generating circuit comprises a DC voltage control system and a current control system. The DC voltage control system generates a current command signal based on the AC voltage detecting signal, the DC voltage detecting signal and the DC voltage command signal. The current command signal is used to make the DC voltage from the controlled rectifier circuit such the DC voltage value as commanded by the DC voltage command signal. The current control system generates a current control signal to make the output of the controlled rectifier circuit such a DC voltage value as commanded by the DC voltage command signal.

In the present invention an inexpensive AC current transformer (ACCT) is used as an AC current detector. However, it is not possible for an AC current transformer to detect whether or not a DC current offset component has been generated in the supply current to the controlled rectifier circuit. Therefore in the present invention a DC component eliminating circuit for eliminating a DC component which causes an offset of the AC current from the current control signal or the modulated current control signal. The DC component eliminating circuit may be arranged inside the current control system or between the modulation circuit and the drive circuit. In such an arrangement, it is possible to eliminate the DC current offset component which causes offsetting the AC current without using an expensive DCCT including expensive hall devices therein. In addition, it is possible to provide a controlled rectifier equipment with sinusoidal waveform supply current at a cost lower than that of conventional equipment and also to produce a controlled rectifier equipment in a simple configuration.

It is arbitrary how to form a DC component eliminating circuit. The DC component eliminating circuit may comprise a negative feedback circuit arranged across a signal line through which the current control signal or the modulated current control signal flows, and a low pass filter arranged in the negative feedback circuit. The low pass filter is easy to design and yet can be formed easily either by hardware or software, thus enabling the DC component eliminating circuit to be formed at a low cost. Therefore besides using an inexpensive AC current transformer, using a low pass filter which can be formed easily contributes to lowering the prices of the controlled rectifier equipment with sinusoidal waveform supply current. The low pass filter is constructed so as to cut off an AC power supply frequency component. In addition, the low pass filter extracts the DC component caused due to an offset generated primarily during signal processing in the AC current detecting circuit, the DC voltage detecting circuit, the AC voltage detecting circuit, the current control system, the DC voltage control system, the modulating circuit and the drive circuit.

It is arbitrary how to form a conduction control signal generating circuit. For example the DC voltage control system may comprise a first subtraction circuit, a voltage controller and a multiplier. The first subtraction circuit obtains the difference between said DC voltage command signal and the DC voltage detecting signal from the DC voltage detecting circuit, and outputs a difference signal. The voltage controller converts and amplifies said difference signal into AC output signal. The multiplier multiplies the AC voltage detecting signal from the AC voltage detecting circuit and the AC output signal from the voltage controller, and outputs the current control signal. The current control system comprises a second subtraction circuit and a current controller. The second subtraction circuit obtains the difference between the current control signal and the AC current detecting signal outputted by the AC current detecting circuit and outputs a difference signal. The current controller amplifies the difference signal outputted by the second subtraction circuit. In addition, the modulation circuit may comprise a PWM modulation circuit.

When a conduction control signal generating circuit has such an arrangement as described above, the DC component eliminating circuit may be arranged between the current controller and the PWM modulation circuit, or between the second subtraction circuit and the current controller, or between the PWM modulation circuit and the drive circuit. While any arrangement of the foregoing maybe used, designing each element becomes easier especially when the DC component eliminating circuit is arranged between the current controller and the PWN modulation circuit.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein:

FIG. 8 is a diagram showing yet another example of a bridge controlled rectifier circuit configuration which can be used in the present invention.

DETAILED DESCRIPTION OF THE PREFERRED EMBODIMENTS

Figure 1:
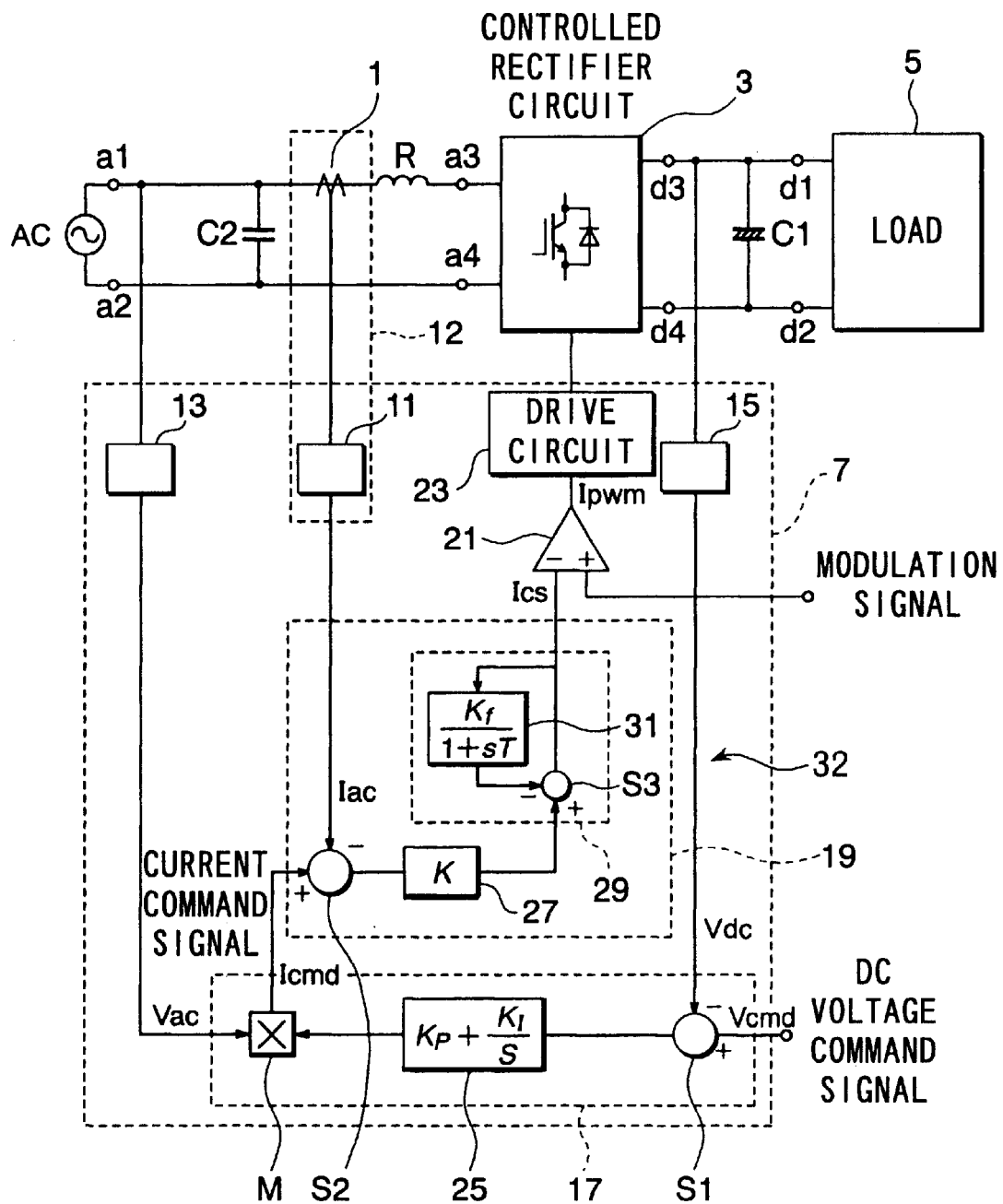
FIG. 1 is an example of the schematic circuit configuration of an embodiment of a controlled rectifier equipment with sinusoidal waveform supply current according to the present invention.

An embodiment of the present invention will be described in detail hereinafter referring to the drawings of the embodiments of the present invention. FIG. 1 is a schematic view of a circuit configuration of the controlled rectifier equipment with sinusoidal waveform supply current of the present invention. An AC current input terminals a1 and a2 are connected with capacitor C2. An end of the Reactor R is connected with the connection point at which an end of the capacitor C2 and an end of the AC current input terminal a1 are connected. The capacitor C2 is used for removing high frequency component which is generated by switching operations in the controlled rectifier circuit 3. On a line between this connection point and one end of Reactor R, an AC current detector consisting of an AC current transformer 1 (ACCT) is arranged. The other end of the Reactor R is connected to an AC current input terminal a3 of the controlled rectifier circuit 3.

As described in detail in the following, the controlled rectifier circuit 3 comprises a plurality of semiconductor switching devices such as transistors and diodes which are connected in bridge connection. The conducting angles of the semiconductor switching devises can be controlled by conduction control signals. By controlling each conducting angle of the plural semiconductor switching devices, this controlled rectifier circuit 3 controls the output DC voltage and also controls so that the waveform of the AC supply current inputted to AC current input terminal a3 and a4 maybe a sinusoidal waveform. DC current output terminals d3 and d4 are connected with a capacitor C1. The voltage appeared across the ends of the capacitor C1 is biased to DC current input terminals d1 and d2 of the load 5.

A circuit designated by a numeral 7 is a conduction control signal generating circuit. The circuit 7 acts to control the conducting angles of the plural semiconductor switching devices of the controlled rectifier circuit 3, and maintain the output DC voltage at a predetermined DC voltage value commanded by a DC voltage command signal. The conduction control signal generating circuit 7 also controls so that the waveform of the AC supply current may be a sinusoidal waveform. The conduction control signal generating circuit 7 has an AC current transformer 1 for detecting AC supply current, and an AC current detecting circuit 12 including a signal-processing circuit 11 for processing the output of the AC current transformer 1. The AC current detecting circuit 12 generates an AC current detecting signal. The circuit 7 also has an AC voltage detecting circuit 13 including a signal-processing circuit. The AC voltage detecting circuit 13 outputs the AC voltage detecting signal processed by the signal-processing circuit. The circuit 7 also has a DC voltage detecting circuit 15 having a signal-processing circuit for signal-processing the DC voltage from the controlled rectifier circuit 3. The circuit 7 further has a DC voltage control system 17, a current control system 19, a modulation circuit 21 for modulating current control signal and a drive circuit 23. The signal-processing circuit 11, the signal-processing circuits included in the AC voltage detecting circuit 13 and the DC voltage detecting circuit 15 respectively comprise an operational amplifier for adjusting impedance. These operational amplifiers have offsets or offset DC voltage appeared in an output. Therefore the accumulation of offsets of devices used in these signal-processing circuits constitute a DC component. This DC component is included in a current control signal Ics which is an output of the current control system 19 and causes an offset to the AC supply current inputted to the controlled rectifier circuit 3. As described in the following, it is possible to use an AC current transformer 1 as an AC current detector by eliminating the DC component.

A DC voltage control system 17 receives the AC current detecting signal Vac outputted by the AC voltage detecting circuit 13, the DC voltage detecting signal Vdc outputted by the DC voltage detecting circuit 15, and the DC voltage command signal Vcmd, in order to control the output voltage of the controlled rectifier circuit 3. The DC voltage control system 17 then generates a current command signal Icmd which is necessary for adjusting the output of the controlled rectifier circuit 3 to be the DC voltage value that is commanded by the DC voltage control signal Vcmd. The DC voltage control system 17 comprises a first subtraction circuit S1, a voltage controller 25 and a multiplier M. The first subtraction circuit S1 generates a DC voltage difference signal by obtaining the difference between the DC voltage command signal Vcmd and a DC voltage detecting signal Vdc from the DC voltage detecting circuit 15. The voltage controller 25 converts the DC voltage difference signal into an AC voltage output signal and amplifies the AC voltage output signal. The multiplier M outputs the current command signal Icm by multiplying the AC voltage detecting signal Vac outputted by the AC voltage detecting circuit 13 and an AC voltage output signal outputted by the voltage controller 25. Kp and KI in the block showing the voltage controller 25 are amplifying factors.

The current control system 19 receives the AC current detecting signal Iac from the AC current detecting circuit 11 and the current command signal Icmd. The current control system 19 outputs the current control signal Ics. The current control signal Ics is used to make the waveform of the AC supply current inputted to the controlled rectifier circuit 3 a sinusoidal waveform. In addition, the current control signal Ics is used to make the output of the controlled rectifier circuit 3 such the DC voltage value commanded by the direct current control signal Vcmd. More particularly the current control system 19 comprises a second subtraction circuit S2, a current controller 27 and a DC component eliminating circuit 29. The second subtraction circuit S2 obtains the difference signal between the current command signal Icmd and the AC current detecting signal Iac from the AC current detecting circuit 11. The current controller 27 amplifies the signal level of the difference signal obtained by the second subtraction circuit S2.

The DC component eliminating circuit 29 comprises a third subtraction circuit S3 and a low pass filter 31. The negative feedback circuit is arranged across a signal line through which the current control signal Ics flows. The low pass filter 31 is arranged in the negative feedback circuit. The third subtraction circuit S3 subtracts the output signal outputted by the low pass filter 31 from the output signal outputted by the current controller 27. The output result from the third subtraction circuit S3 is again inputted to the low pass filter 31 and the modulation circuit 21. The low pass filter is formed so as to cut off an AC power supply frequency component. The low pass filter 31 also extracts the DC component caused due to an offset generated primarily during signal processing in the AC current detecting circuit 12, the DC voltage detecting circuit 15, the AC voltage detecting circuit 13, the current control system 19, the DC voltage control system 17, the modulation circuit 21 and the drive circuit 23. Therefor, the DC component eliminating circuit 29 outputs only the AC component to the modulation circuit 21. A circuit constant Kf shown at numerator of the low pass filter 31 is adjusted so that the offset component or DC component appearing in the AC supply current waveform is cancelled. A circuit constant T shown at denominator of the low pass filter 31 is determined to cut off the AC power supply frequency component.

In this embodiment, by using the DC component eliminating circuit 29 as described above, the DC offset voltage can be assuredly eliminated from the supply current to the controlled rectifier circuit 3, even if an AC current transformer is used as the AC current detector. In this embodiment, a current control signal generating circuit 32 comprises the DC voltage control system 17 and the current control system 19.

The modulation circuit 21 modulates the current control signal Ics with the pulse width modulation (PWM), and outputs a PWM signal or modulated current control signal Ipwm to the drive circuit 23. The modulation circuit 21 compares the current control signal Ics with a modulation signal such as a saw tooth-shaped waveform signal or a triangle-shaped waveform signal in order to output the modulated current control signal Ipwm. The modulation circuit 21 comprises a PWM modulation circuit consisting of a comparator, and is fed with the modulation signal from a signal generator (not shown). In this instance the modulation circuit 21, which can be used in the present invention, is not limited to the PWM modulation circuit and the modulation signal is not limited to the saw tooth-shaped waveform signal either.

The drive circuit 23 outputs drive signals, based on the modulated current control signal Ipwm outputted by the modulation circuit 21, to a plurality of semiconductor switching devices in the controlled rectifier circuit 3.

Figure 2:
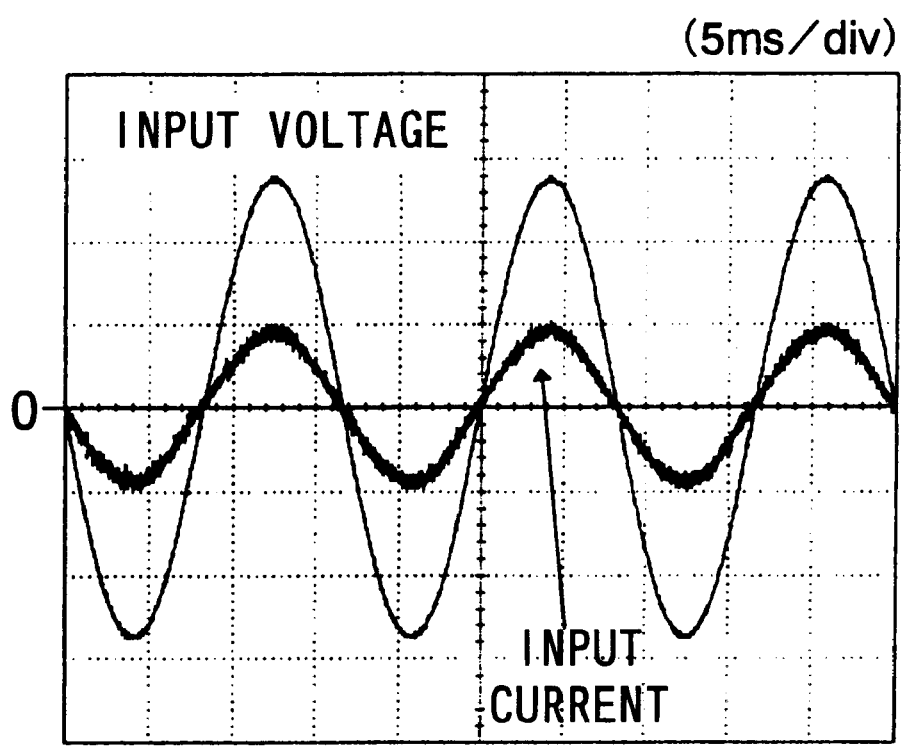
FIG. 2 is an example showing waveforms of supply voltage and supply current when the present invention is applied.
Figure 3:
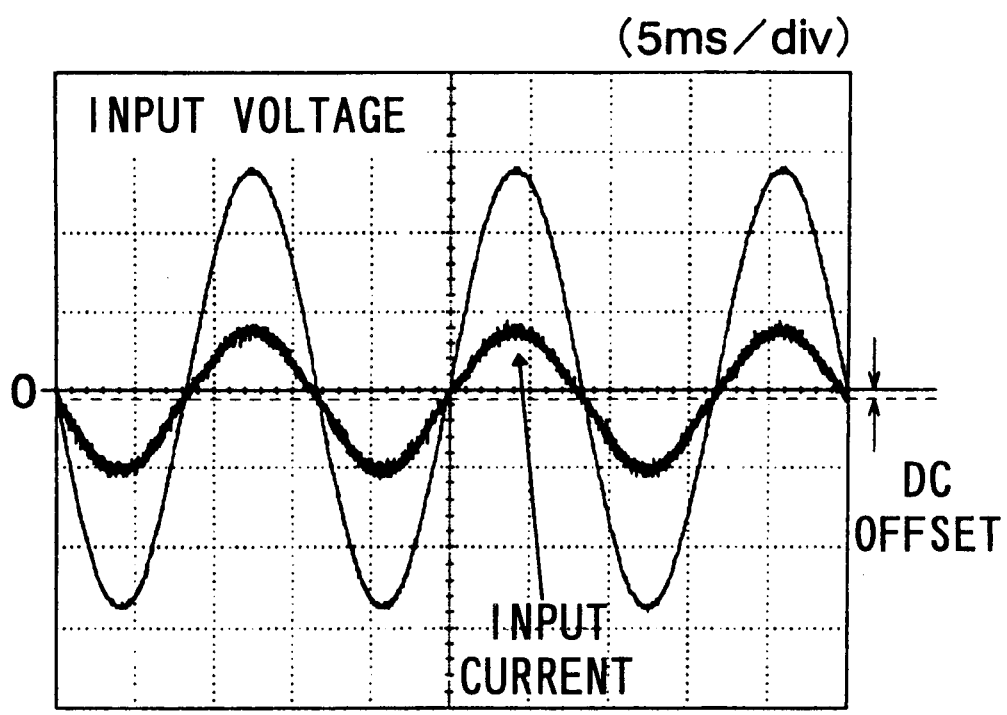
FIG. 3 is an example showing waveforms of supply voltage and supply current when a direct current eliminating circuit is not included in the circuit configuration according to the present invention.

In this embodiment how the DC offset component appearing in the waveform of the AC supply current to the controlled rectifier circuit 3 can be cancelled is described with reference to FIGS. 2 and 3. FIG. 2 shows an example of waveforms of the supply voltage or input voltage and the supply current or input current in which example the present invention is applied. FIG. 3 shows an example of waveforms of the input voltage and the input current in which example the DC component eliminating circuit is not arranged in the circuit configuration of the present invention. FIG. 2 shows a waveform of the input voltage with effective value 100V/

60 Hz and a waveform of the input current, under such effective value of the input voltage, in the circuit shown in FIG. 1. The waveform of the input or supply current is periodically oscillating with the same amplitude in both positive and negative directions, with the center of the oscillation lying on the base line (y=0 line) and with a constant period and a DC offset component is not shown. FIG. 3 shows a waveform of the input voltage and a waveform of the input current in the circuit shown in FIG. 1 when the DC component eliminating circuit 29 is not arranged therein. The waveform of the input voltage is just the same as the waveform of the input voltage shown in FIG. 2. However, the waveform of the input or supply current shown in FIG. 3 is periodically oscillating with the same amplitude in both positive and negative directions, with the center of the oscillation shifted or offset downward from the base line (y=0 line). This shift of the center shows a DC offset component.

Figure 4:
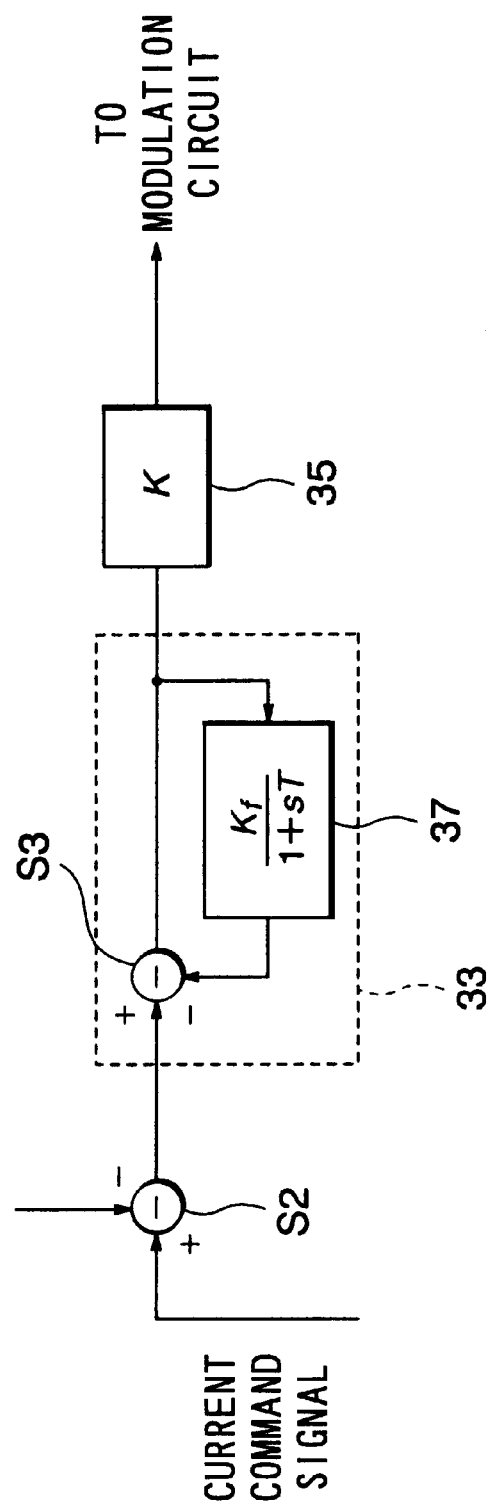
FIG. 4 is a diagram showing a position at which a DC component eliminating circuit is arranged in another embodiment of the present invention.
Figure 5:
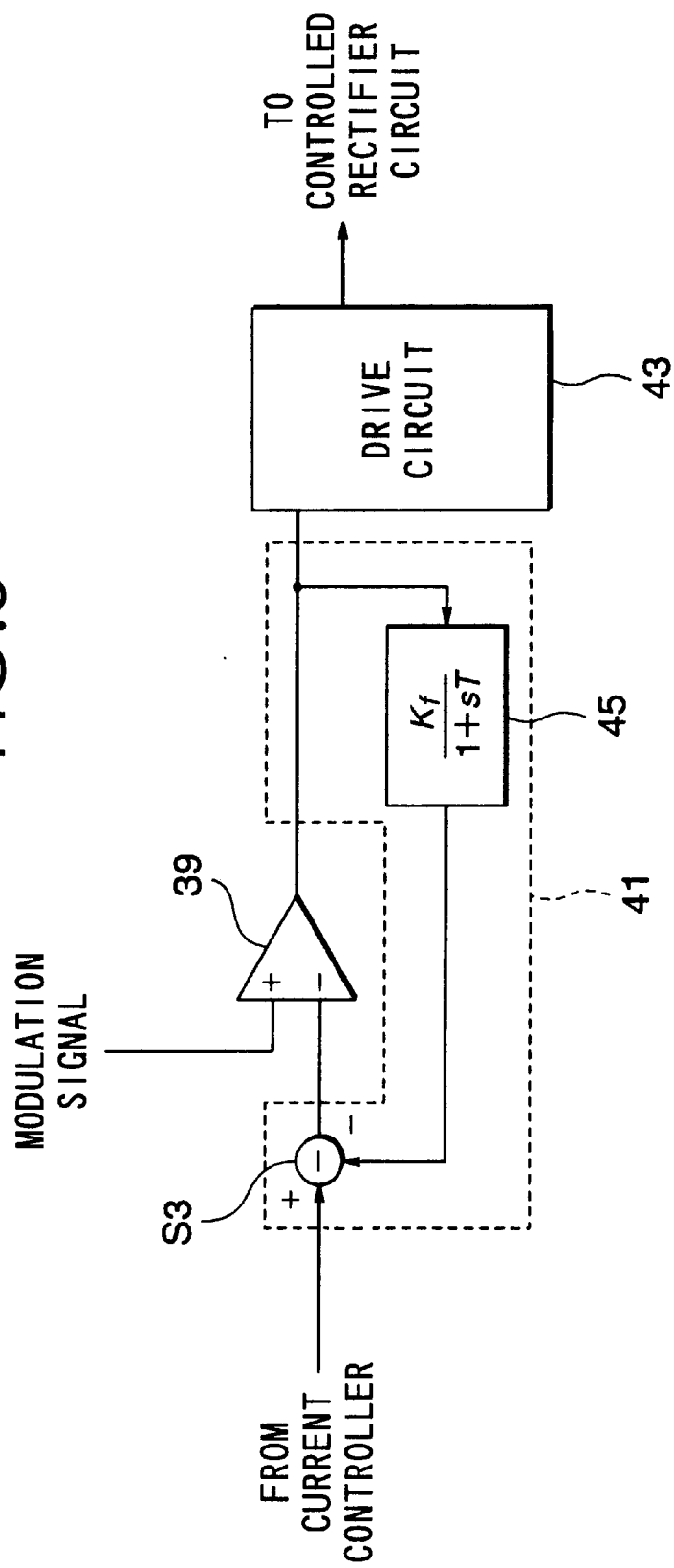
FIG. 5 is a diagram showing a position at which a DC component eliminating circuit is arranged in still another embodiment of the present invention.

In FIGS. 4 and 5 other examples of circuit configuration arranging a DC component eliminating circuit at different positions in the circuit configuration are shown. FIG. 4 is another example of the circuit configuration with a DC component eliminating circuit 33 arranged at a different position. In FIG. 4 a DC component eliminating circuit 33 is arranged between the second subtraction circuit S2 and the current controller 35. The amplifying factor K of the current controller 35 is determined, taking it into consideration that the subtraction circuits S2 and S3 are arranged in series. FIG. 5 shows another example of the circuit configuration in which a feedback circuit is arranged at yet another position. In FIG. 5 a DC component eliminating circuit 41 is arranged between an current controller and a drive circuit 43 having the PWM modulation circuit 39 in-between, in order to eliminate the DC component from the modulated current control signal. In other words, the feedback circuit is arranged across the modulation circuit 39 or a signal line through which the modulated current control signal flows. The amplifying factor K of the low pass filter 45 in this example is determined, taking account of the drastic change in the waveform due to the modulation circuit 39.

Figure 6:
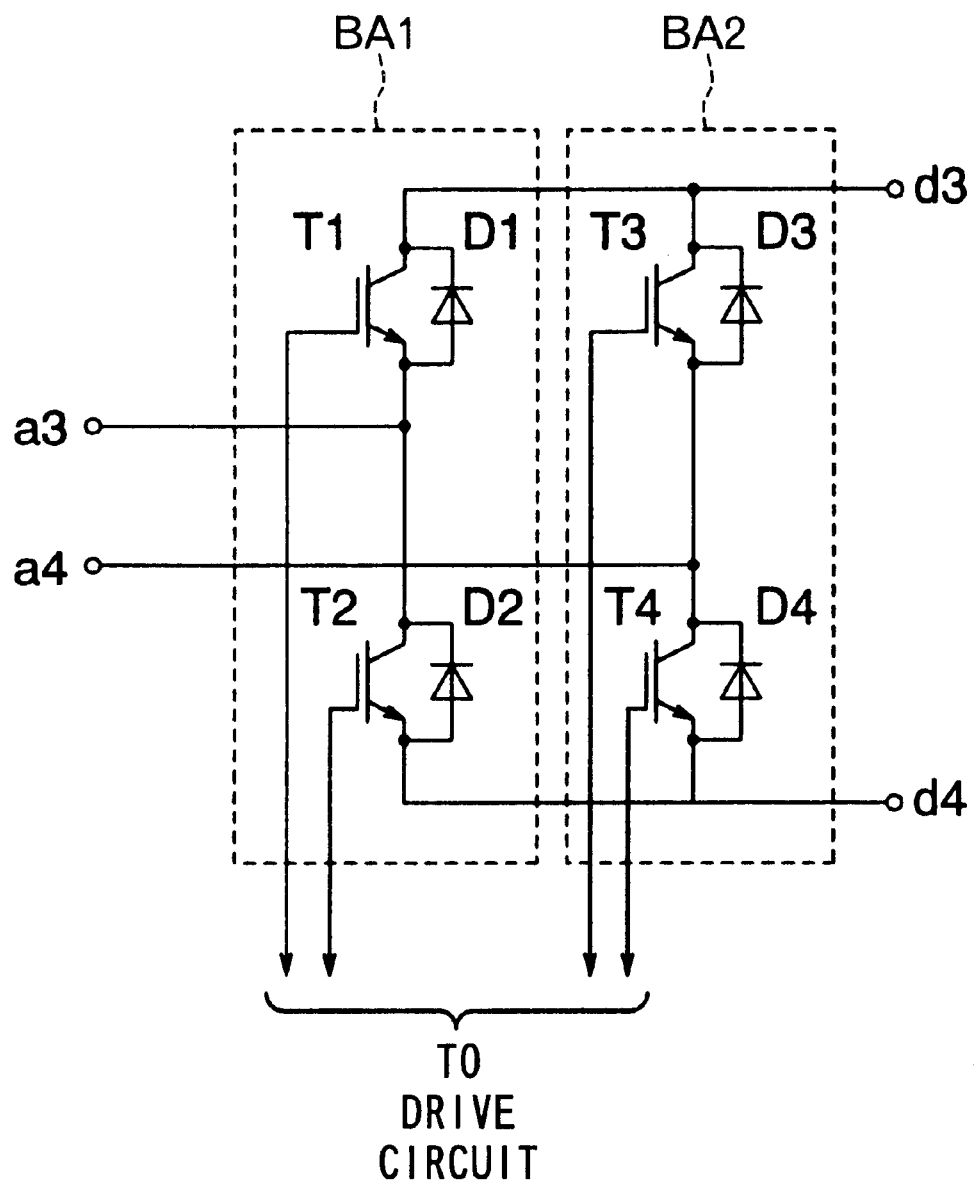
FIG. 6 is a diagram showing an example of a bridge controlled rectifier circuit configuration which can be used in the present invention.
Figure 7:
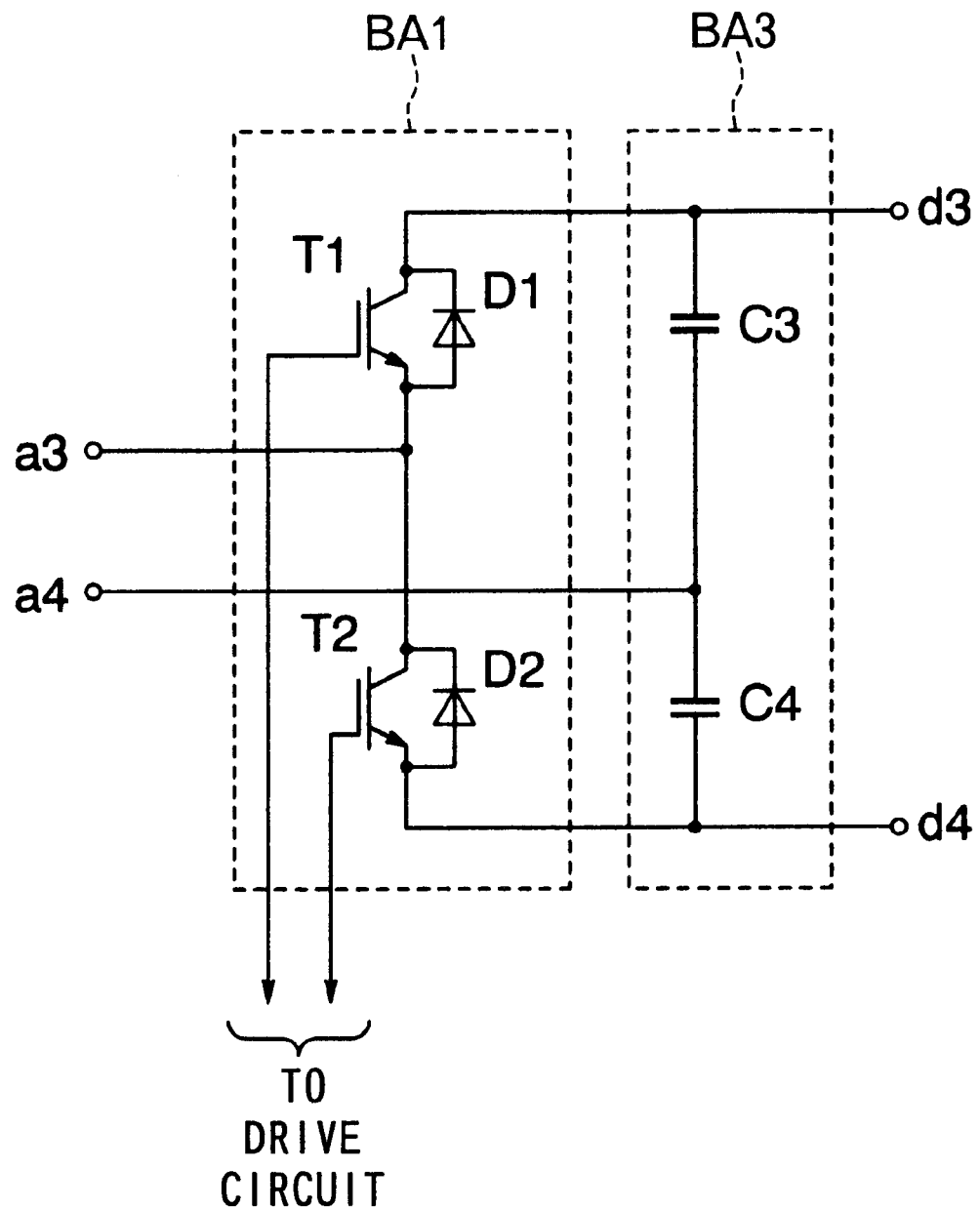
FIG. 7 is a diagram showing another example of a bridge controlled rectifier circuit configuration which can be used in the present invention.

FIGS. 6, 7 and 8 show circuit configurations in which controlled rectifier circuit 3 is formed in a bridge rectifier circuit configuration. FIG. 6 shows a circuit configuration called "full bridge circuit configuration." This full bridge circuit configuration is formed with a bridge arm BA 1 having a plurality of switching circuits (two switching circuits in the FIG. 6). Bridge arm BA1 comprises switching devices T1 and T2 and diodes D1 and D2, the conducting angles of which can be controlled. The diodes D1 and D2 are anti-parallelly connected across the transistors T1 and T2, respectively. A second bridge arm BA2 is formed just as the first bridge arm BA 1 is. The middle points of each bridge arm are connected with the AC input terminals a3 and a4 of the controlled rectifier circuit 3. A drive signal from the drive circuit 23 is sent to the switching devices T1–T4 of the two bridge arms and current rectifying operation is carried out.

In FIG. 7 the first bridge arm BA1 is just the same as the BA1 in FIG. 6, but the second bridge arm BA3 has capacitors C3 and C4 instead of switching devices T3 and T4 and diodes D3 and D4. This circuit configuration is called "half bridge circuit configuration."

FIG. 8 shows a circuit configuration in which the bridge arm BA1 is just the same as BA1 in FIG. 6, but the second bridge arm BA4 has diodes D5 and D6 instead of switching devices T3 and T4 and diodes D3 and D4. This configuration is called "mixed bridge circuit configuration." The half bridge circuit configuration and the mixed bridge circuit configuration conduct similar operations as the operations of the present application, as described above using the full bridge circuit configuration. In the half bridge circuit configuration and the mixed bridge circuit configuration, a drive circuit is unnecessary for driving the second bridge arm BA3 and BA 4. However this point does not directly concerns the use of an AC current detector and compensation of the DC offset component arising from the use of the AC current detector, which are the contents of the present invention.

In order to form semiconductor switching devices T1–T4 in the controlled rectifier circuit as described above, any semiconductor switching devices can be used as far as such semiconductor switching devices can control the conducting angle. In the controlled rectifier circuit of the present invention such transistors for high voltage as "high voltage transistor", "high voltage FET" and "IGBT" are used as semiconductor switching devices.

In addition, as described above, the signal processing circuit 11 and the detecting circuits 13 and 15 have well-known signal processing circuits. The well-known circuits have impedance converting circuits or the like comprising operational amplifiers in the voltage dividing circuit or the current dividing circuit. With such arrangement noise is reduced and the logic level required is attained. Furthermore it is also possible to convert analogue signals into digital signals by including AC current/direct current converting circuit in the signal processing circuits 11, 13 and 15, thus digital processing of the above described conduction control signal generating circuit 7 is enabled. Therefore, the technological concept of the present invention can be realized through either by the digital processing and the analogue processing.

As described above, an AC current transformer 1 is used as the current detector and thus costs can be reduced. Because the AC current transformer is cheap and does not need DC power supply. Moreover, in the present invention, in order to compensate the DC offset component, the DC component eliminating circuits 29, 33 or 41 is arranged at an arbitrary point between the subtraction circuit S2 and the drive circuits 23 or 43 for extracting the offset component. The compensation is carried out so that the offset component is eliminated. In such an arrangement it is possible to provide a highly efficient rectifier equipment which maintains the waveform of the AC supply current as a sinusoidal waveform and yet to control the output voltage thereof at such level as required.

According to the present invention, the DC component which is a cause of offsetting the AC supply current can be eliminated without using a DC current detector including expensive hall devices. Therefore it is possible to provide a controlled rectifier equipment with sinusoidal waveform supply current at prices lower than conventionally quoted as well as to produce the controlled rectifier equipment in a simple configuration.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A controlled rectifier equipment with sinusoidal waveform supply current comprising:
   a controlled rectifier circuit including semiconductor switching devices of which conducting angles can be controlled; and a conduction control signal generating circuit which gives conduction control signals to said semiconductor switching devices for controlling said conducting angles so that said controlled rectifier circuit converts AC power to DC power and yet so that a waveform of AC supply current supplied to said controlled rectifier circuit may be a sinusoidal waveform;

said conduction control signal generating circuit comprising:

an AC current detecting circuit detecting said AC supply current by an AC current detector and generating an AC current detecting signal, the AC current detector being an AC current transformer;

an AC voltage detecting circuit detecting an AC voltage supplied to said controlled rectifier circuit and generating an AC voltage detecting signal;

a DC voltage detecting circuit detecting a DC voltage outputted from said controlled rectifier circuit and generating a DC voltage detecting signal; and a current control signal generating circuit generating a current control signal based on said AC current detecting signal, said AC voltage detecting signal, said DC voltage detecting signal and a voltage command signal commanding a DC voltage value to be outputted from said controlled rectifier circuit, so that said current control signal is used to make the waveform of said AC supply current a sinusoidal waveform and make the DC voltage from said controlled rectifier circuit such the DC voltage value as commanded by said DC voltage command signal; and a driving circuit generating said conduction control signals based on the current control signal;

wherein said current control signal generating circuit having a DC component eliminating circuit for eliminating a DC component which causes an offset of said AC supply current from said current control signal.

2. A controlled rectifier equipment with sinusoidal waveform supply current as defined in claim 1 wherein said DC component eliminating circuit comprises a negative feedback circuit arranged across a signal line through which the current control signal flows, and a low pass filter arranged in the negative feedback circuit.

3. A controlled rectifier equipment with sinusoidal waveform supply current as defined in claim 2 wherein said low pass filter is formed so as to cut off an AC power supply frequency component and extract said DC component caused due to an offset generated primarily during signal processing in said AC current detecting circuit, said DC voltage detecting circuit, said AC voltage detecting circuit, said current control system, said DC voltage control system circuit and said drive circuit.

4. A controlled rectifier equipment with sinusoidal waveform supply current comprising:

a controlled rectifier circuit including semiconductor switching devices of which conducting angles can be controlled; and a conduction control signal generating circuit which gives conduction control signals to said semiconductor switching devices for controlling said conducting angles so that said controlled rectifier circuit converts AC power to DC power and yet so that a waveform of AC supply current supplied to said controlled rectifier circuit may be a sinusoidal waveform;

said conduction control signal generating circuit comprising:

an AC current detecting circuit detecting said AC supply current by an AC current detector and generating an AC current detecting signal, the AC current detector being an AC current transformer;

an AC voltage detecting circuit detecting an AC voltage supplied to said controlled rectifier circuit and generating an AC voltage detecting signal;

a DC voltage detecting circuit detecting a DC voltage outputted from said controlled rectifier circuit and generating a DC voltage detecting signal; and a current control signal generating circuit generating a current control signal based on said AC current detecting signal, said AC voltage detecting signal, said DC voltage detecting signal and a voltage command signal commanding a DC voltage value to be outputted from said controlled rectifier circuit, so that said current control signal is used to make the waveform of said AC supply current a sinusoidal waveform and make the DC voltage from said controlled rectifier circuit such the DC voltage value as commanded by said DC voltage command signal;

a modulation circuit for modulating said current control signal and generating a modulated current control signal;

a driving circuit generating said conduction control signals based on the modulated current control signal; and a DC component eliminating circuit for eliminating a DC component which causes an offset of said AC supply current from said modulated current control signal.

5. A controlled rectifier equipment with sinusoidal waveform supply current as defined in claim 4 wherein said DC component eliminating circuit comprises a negative feedback circuit arranged across the modulation circuit and a low pass filter arranged in the negative feedback circuit.

6. A controlled rectifier equipment with sinusoidal waveform supply current as defined in claim 5 wherein said low pass filter is formed so as to cut off an AC power supply frequency component and extract said DC component caused due to an offset generated primarily during signal processing in said AC current detecting circuit, said DC voltage detecting circuit, said AC voltage detecting circuit, said current control system, said DC voltage control system, said modulating circuit and said drive circuit.

7. A controlled rectifier equipment with sinusoidal waveform supply current comprising:

a controlled rectifier circuit including semiconductor switching devices of which conducting angles can be controlled; and a conduction control signal generating circuit which gives conduction control signals to said semiconductor switching devices for controlling said conducting angles so that said controlled rectifier circuit converts AC power to DC power and yet so that a waveform of AC supply current supplied to said controlled rectifier circuit may be a sinusoidal waveform;

said conduction control signal generating circuit including comprising:

an AC current detecting circuit having an AC current detector for detecting said AC supply current and generating an AC current detecting signal by processing an output signal from the AC current detector, the AC current detector being an AC current transformer;

an AC voltage detecting circuit detecting an AC voltage supplied to said controlled rectifier circuit and generating an AC voltage detecting signal by processing the AC voltage;

a DC voltage detecting circuit detecting a DC voltage outputted from said controlled rectifier circuit and generating a DC voltage detecting signal by processing the DC voltage;

a DC voltage control system generating a current command signal based on the AC voltage detecting signal, the DC voltage detecting signal and a DC voltage command signal for commanding DC voltage value to be outputted from said controlled rectifier circuit, the current command signal being used to make the DC voltage from said controlled rectifier circuit such the DC voltage value as commanded by said DC voltage command signal;

a current control system generating a current control signal based on said current command signal and the AC current detecting signal from said AC current detecting circuit, said current control signal being used to make the waveform of said AC supply current a sinusoidal waveform and make the DC voltage from said controlled rectifier circuit such the DC voltage value as commanded by said DC voltage command signal;

a modulation circuit for modulating said current control signal and generating a modulated current control signal;

a drive circuit generating said conduction control signals based on said modulated current control signal from said modulation circuit; and a DC component eliminating circuit for eliminating DC component which causes an offset of said AC supply current from said current control signal or said modulated current control signal.

8. A controlled rectifier equipment with sinusoidal waveform supply current as defined in claim 7 wherein said DC component eliminating circuit is arranged inside said current control system or between said modulation circuit and said drive circuit.

9. A controlled rectifier equipment with sinusoidal waveform supply current as defined in claim 7 wherein said DC voltage control system comprises:

a first subtraction circuit which obtains the difference between said DC voltage command signal and said DC voltage detecting signal from said DC voltage detecting circuit, and outputs a difference signal;

a voltage controller which converts and amplifies said difference signal into an AC output signal; and a multiplier which multiplies said AC voltage detecting signal from said AC voltage detecting circuit and the AC output signal from said voltage controller, and outputs said current control signal;

wherein said current control system comprises:

a second subtraction circuit which obtains the difference between said current control signal and said AC current detecting signal outputted by said AC current detecting circuit and outputs a difference signal; and a current controller which amplifies the difference signal outputted by said second subtraction circuit;

wherein said modulation circuit comprises a PWM modulation circuit.

10. A controlled rectifier equipment with sinusoidal waveform supply current as defined in claim 9 wherein said DC component eliminating circuit is arranged between said current controller and said PWM modulation circuit.

11. A controlled rectifier equipment with sinusoidal waveform supply current as defined in claim 9 wherein said DC component eliminating circuit is arranged between said second subtraction circuit and said current controller.

12. A controlled rectifier equipment with sinusoidal waveform supply current as defined in claim 9 wherein said DC component eliminating circuit is arranged between said PWM modulation circuit and said drive circuit.

* * * * *

UNITED STATES PATENT AND TRADEMARK OFFICE
CERTIFICATE OF CORRECTION

PATENT NO.      : 6,611,442 B2
DATED           : August 26, 2003
INVENTOR(S)     : Hanaoka et al.

It is certified that error appears in the above-identified patent and that said Letters Patent is hereby corrected as shown below:

<u>Title page,</u>
Item [75], Inventors, (both occurrences) delete "Toshima-ku" and insert
-- Nagano --.

<u>Column 2,</u>
Line 9, delete "maybe" and insert -- may be --.

<u>Column 4,</u>
Line 55, delete "maybe" and insert -- may be --.

Signed and Sealed this

Second Day of December, 2003

JAMES E. ROGAN
*Director of the United States Patent and Trademark Office*